(12) United States Patent
Bettenwort et al.

(10) Patent No.: US 9,401,662 B2
(45) Date of Patent: Jul. 26, 2016

(54) INVERTER WITH AN AC INTERFACE FOR THE CONNECTION OF AC MODULES

(71) Applicant: SMA Solar Technology AG, Niestetal (DE)

(72) Inventors: Gerd Bettenwort, Kassel (DE); Joachim Laschinski, Kassel (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 640 days.

(21) Appl. No.: 13/760,624

(22) Filed: Feb. 6, 2013

(65) Prior Publication Data
US 2013/0147275 A1    Jun. 13, 2013

Related U.S. Application Data

(63) Continuation of application No. PCT/EP2011/064840, filed on Aug. 29, 2011.

(30) Foreign Application Priority Data

Aug. 31, 2010  (DE) .......................... 10 2010 036 033

(51) Int. Cl.
*H02J 1/10* (2006.01)
*H02M 7/44* (2006.01)
*H02J 3/38* (2006.01)

(52) U.S. Cl.
CPC ................. *H02M 7/44* (2013.01); *H02J 3/383* (2013.01); *Y02E 10/563* (2013.01); *Y10T 307/50* (2015.04)

(58) Field of Classification Search
CPC ............. H02J 3/383; H02J 3/385; H02J 4/00; H02J 7/35; H02J 7/025; H02J 1/10; H02J 3/382; H02J 9/00; H02J 9/061; H02J 1/102; H02J 2007/0067; H02J 3/008; H02J 3/32; H02J 3/381; H02J 3/38
USPC ............................................................ 307/43
See application file for complete search history.

(56) References Cited

U.S. PATENT DOCUMENTS

| | | | | |
|---|---|---|---|---|
| 7,042,195 B2 * | 5/2006 | Tsunetsugu | ............... | G05F 1/67 320/101 |
| 7,960,863 B2 * | 6/2011 | Fife | ........................... | G05F 1/67 136/206 |
| 8,013,472 B2 * | 9/2011 | Adest | ...................... | H02J 3/385 307/77 |

(Continued)

FOREIGN PATENT DOCUMENTS

| | | |
|---|---|---|
| CN | 101494385 A | 7/2009 |
| DE | 10044570 A1 | 4/2001 |

(Continued)

OTHER PUBLICATIONS

International Search Report and Written Opinion of the International Searching Authority dated Mar. 23, 2012 for International Application No. PCT/EP2011/064840. 15 Pages.

*Primary Examiner* — Jared Fureman
*Assistant Examiner* — Esayas Yeshaw
(74) *Attorney, Agent, or Firm* — Eschweiler & Associates, LLC

(57) ABSTRACT

An inverter for feeding a grid-compatible AC voltage into a grid is described, wherein the inverter includes an inverter bridge for converting a DC voltage to a first AC voltage and a grid interface between the inverter bridge and the grid for converting the first AC voltage to the grid-compatible AC voltage for feeding into the grid. An AC interface via which an AC module for feeding into the grid can be connected, is arranged between the inverter bridge and the grid interface.

18 Claims, 9 Drawing Sheets

(56) References Cited

U.S. PATENT DOCUMENTS

| | | | |
|---|---|---|---|
| 8,106,537 B2* | 1/2012 | Casey | H01L 31/02021 307/82 |
| 8,618,692 B2* | 12/2013 | Adest | 307/58 |
| 2003/0111103 A1 | 6/2003 | Bower et al. | |
| 2003/0218888 A1 | 11/2003 | Suzui et al. | |
| 2005/0002214 A1* | 1/2005 | Deng | G05F 1/67 363/131 |
| 2007/0027644 A1* | 2/2007 | Bettenwort | G05F 1/67 702/60 |
| 2009/0000654 A1* | 1/2009 | Rotzoll | H02M 7/493 136/244 |
| 2010/0327657 A1* | 12/2010 | Kuran | H02J 3/38 307/43 |
| 2011/0012430 A1* | 1/2011 | Cheng | H01L 31/02021 307/82 |
| 2012/0042588 A1* | 2/2012 | Erickson, Jr. | H01L 31/02021 52/173.3 |

FOREIGN PATENT DOCUMENTS

| | | |
|---|---|---|
| EP | 2104216 A1 | 9/2009 |
| JP | 9201061 A | 7/1997 |
| WO | 2006084294 A1 | 8/2006 |
| WO | 2008144540 A1 | 11/2008 |

* cited by examiner

250
INVERTER WITH AN AC INTERFACE FOR THE CONNECTION OF AC MODULES

REFERENCE TO RELATED APPLICATIONS

This application is a continuation of international application number PCT/EP2011/064840 filed on Aug. 29, 2011, which claims priority to German patent application number 10 2010 036 033.3 filed on Aug. 31, 2010.

FIELD

The disclosure relates to an inverter.

BACKGROUND

Conventional photovoltaic (PV) inverters such as central or string inverters or inverters having a multiplicity of parallel strings carry out a number of additional functionalities in addition to their main task of converting the direct current produced by the PV generator to grid-compatible alternating current. Amongst others, these additional functionalities may be: communication with the user via an HMI (human-machine interface) or via other communication channels, grid monitoring functions, grid support functions, and safety functions.

Furthermore, the PV generator is kept at the maximum-power point by maximum-power point tracking (MPP tracking).

At the same time, the size of the PV generator is generally governed by the nominal power of the inverter, thus restricting the scalability of the overall photovoltaic system.

Since the current in a string is governed by the characteristics of its weakest PV module, only identical modules, or modules that are as similar as possible, of the same technology should be used within the string.

If the incident radiation on the PV generator is not homogeneous, for example because of partial shadowing, the maximum possible power cannot be extracted from the PV generator, because the PV modules have different optimum operating points (MPPs), which cannot be set individually in a series or parallel circuit.

The disadvantages of conventional PV inverters, like for example the restricted scalability, restrictions when modules of different types are used together and high sensitivity to incident radiation that is not homogeneous, are almost completely avoided when using inverters that are referred to as being close to the module, module-oriented or module-integrated (that is to say a dedicated inverter with an AC output and its own MPP tracking for each module, which is referred to in the following text as an AC module). However, if the intention is to integrate the additional functions mentioned at the beginning in an AC module, the specific price (costs related to the power) is considerably higher than for conventional PV inverters. Furthermore, the efficiency of the AC modules can, in principle, not reach the efficiency of conventional PV inverters. Until now, this has led to it not being possible to introduce AC modules to the market successfully.

SUMMARY

A system would therefore be desirable that combines the advantages of both technologies with one another. One aspect of the present disclosure is therefore an AC interface that is integrated in an inverter and via which the power from decentralized AC modules connected thereto is fed into a grid. An inverter such as this is also referred to in the following text as a basic inverter. This results in minor additional costs, while the costs of the decentralized AC modules can be drastically reduced, since their functionality can be reduced to the basic functions such as inversion and MPP tracking, with the additional functions mentioned above being provided by the basic inverter also for the proportion of the power that is produced by the AC modules.

This allows almost all building locations to be used better for PV installations. In particular, a system such as this represents a considerably more cost-effective variant than DC/DC controllers close to the module, so-called power optimizers.

The disclosure relates to an inverter for a photovoltaic system that partially or completely satisfies the following requirements and provides the following functionalities: conversion of the direct current provided by the PV generator in the photovoltaic system to grid-compatible alternating current, module-by-module optimized MPP tracking, high energy efficiency, low specific price, communication of the system with the user via a standard HMI, grid monitoring functions, grid support functions, adjustable reactive power (supply, reference, compensation), safety functions, simple and flexible scalability of the PV generator, use of different PV generator types and technologies (for example thin-film cells and monocrystalline cells) in one photovoltaic system, energy-optimized use of a PV generator that is not illuminated homogeneously (shadowing, different module alignment, etc.), and capability to use the PV inverter with or without galvanic isolation, in which case both types can also be used within the same photovoltaic system.

According to one embodiment an inverter comprises an inverter bridge for converting a DC voltage to a first AC voltage and a grid interface between the inverter bridge and the grid for converting the first AC voltage to the grid-compatible AC voltage for feeding into the grid. An AC interface via which one or more AC modules for feeding into the grid can be connected, is arranged between the inverter bridge and the grid interface.

It has been found that many installations have a part of the generator area that is freely illuminated homogeneously, without being impeded by obstructions that throw shadows, throughout the majority of the time of the year. For rural installations, this part normally represents the entire area. This part decreases as the area affected by shadowing obstructions increases. One typical example are roof areas with dormers that throw a shadow onto PV generators installed in the vicinity at some times over the course of the day. However, only in rare cases more than 50% of the generator area is affected. It is therefore worthwhile combining areas of the generator that are illuminated homogeneously and freely to form a unit, and to allow the power to be converted centrally in one inverter. This is the best solution in terms of energy and investment costs.

Decentralized power conditioning as close to the module as possible is the energetically best solution for parts that are not illuminated homogeneously at some times. AC modules, in particular, can be used for this purpose, since they can carry out MPP tracking independently of one another. In order to allow them to be designed as cost-effectively and energy-efficiently as possible, it is desirable to reduce the design of these devices to the necessary basic functions. This allows considerably better utilization of existing roof areas, since area parts for which the use was not economic when using previous system architectures become economic in this way.

According to the disclosure, the inverter is extended such that one or more AC modules can be connected to it by means of an AC interface. This allows the basic functions of the AC modules to be reduced, such that inclusion in the photovoltaic overall system is possible, even though direct connection of the AC modules for feeding power into a power grid would not be permissible.

It is apparent that the conversion of the DC voltage into the first AC voltage by the inverter bridge and the conversion of the first AC voltage into the grid-compatible AC voltage is accompanied with a conversion of a DC current into a first AC current and further into a grid-compatible AC current. The use of the term "voltage" in the claims is not limiting in this sense.

In one embodiment of the inverter, the grid interface has switch disconnectors for disconnecting the inverter from the grid and/or for connecting the inverter to the grid. In one embodiment the switch disconnectors are operated dependent on a state of the grid. Further, the state of the grid concerns a voltage and/or a frequency of an electrical current within the grid and/or an islanding condition. Switch disconnectors are means for controlling that power is fed into the grid in a grid-compatible manner.

In a further embodiment of the inverter, the grid interface has a filter device. The filter device is used to form a sine-like AC-voltage for feeding power into the grid. The filter is a further means to ensure that power is fed into the grid in a grid-compatible manner.

In a further embodiment of the inverter, the grid interface has a safety device. In yet a further embodiment of the inverter, the inverter has measurement points via which a current value via the inverter bridge and a current value via the AC interface can be recorded. The safety device as well as the measurement points allow to control that power is fed into the grid in a grid-compatible manner.

In a further embodiment of the inverter, the inverter has a communication unit for exchanging data with AC modules that are connected to the AC interface. It is advantageous in one embodiment that the communication unit is designed to exchange data via lines of the AC interface or is designed for wireless exchange of data. Further, in one embodiment the communication unit is designed to exchange data for one of the following purposes: remote control or remote diagnostics of connected AC modules; storage or transmission of measured values, breakdown or failures of connected AC modules; transmission of control signals to connected AC modules; and display of data of connected AC modules on a display unit of the inverter.

The communication unit allows for an integral controlling and monitoring of all modules of a photovoltaic system, i.e. also of the AC modules connected to the inverter via the AC interface.

BRIEF DESCRIPTION OF THE DRAWINGS

The invention will be described in the following text using example embodiments and with reference to the drawings. The illustrated figures shall be understood in an illustrative and non-restrictive manner and are intended to make it easier to understand the invention. In this case.

DETAILED DESCRIPTION

Figure 1:
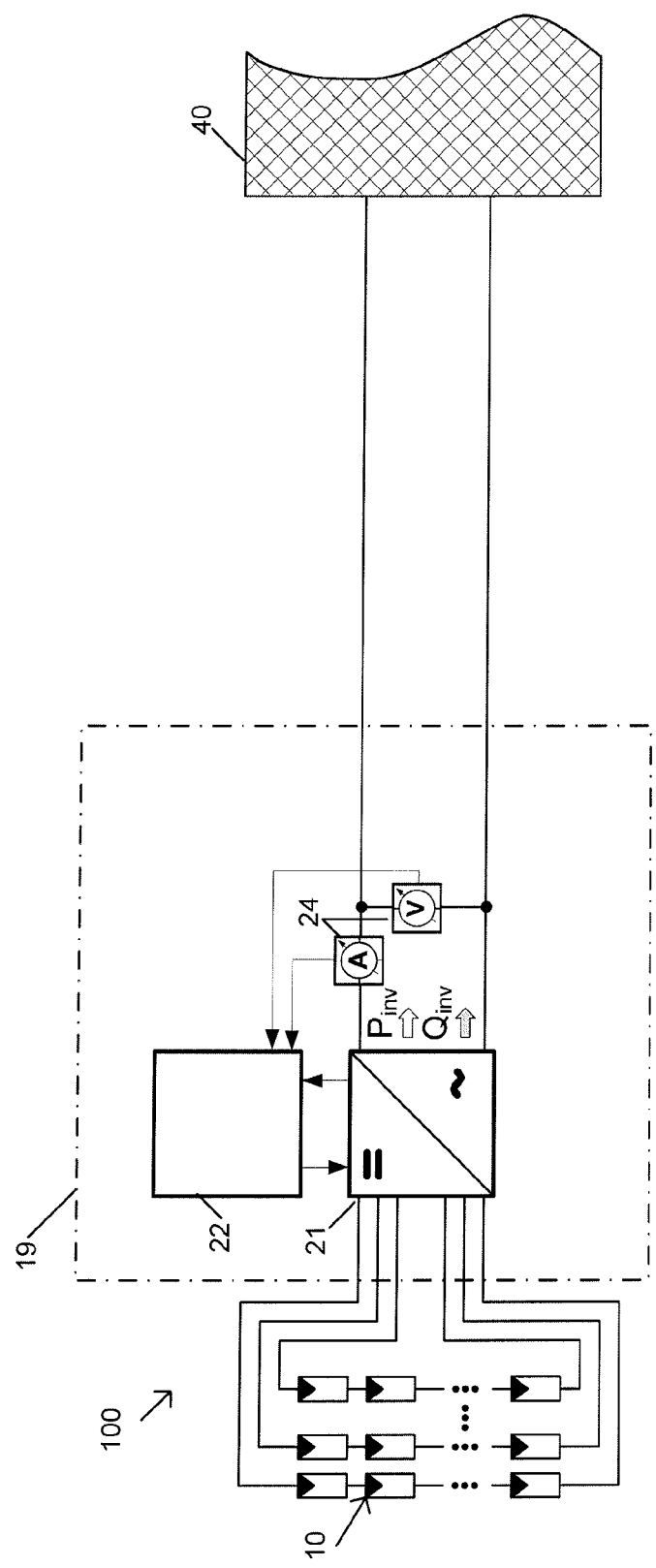
FIG. 1 shows a schematic illustration of a conventional inverter.

FIG. 1 shows a photovoltaic system 100 with a conventional inverter 19. The inverter 19 has an inverter bridge 21, by means of which a direct current from a connected PV generator 10 can be converted to an alternating current. The inverter bridge 21 is connected to a grid 40 for feeding the power that is produced from the PV generator in the form of real power $P_{inv}$ and reactive power $Q_{inv}$. The feeding can be monitored, synchronized and controlled via a central processor (CPU) 22 by means of the measurement points 24, which are designed to measure current and/or voltage values. In this case, the PV generator 10 comprises a number of series-connected PV modules, which form a string. Frequently, a number of strings are connected in parallel, and are connected to the inverter.

Figure 2:
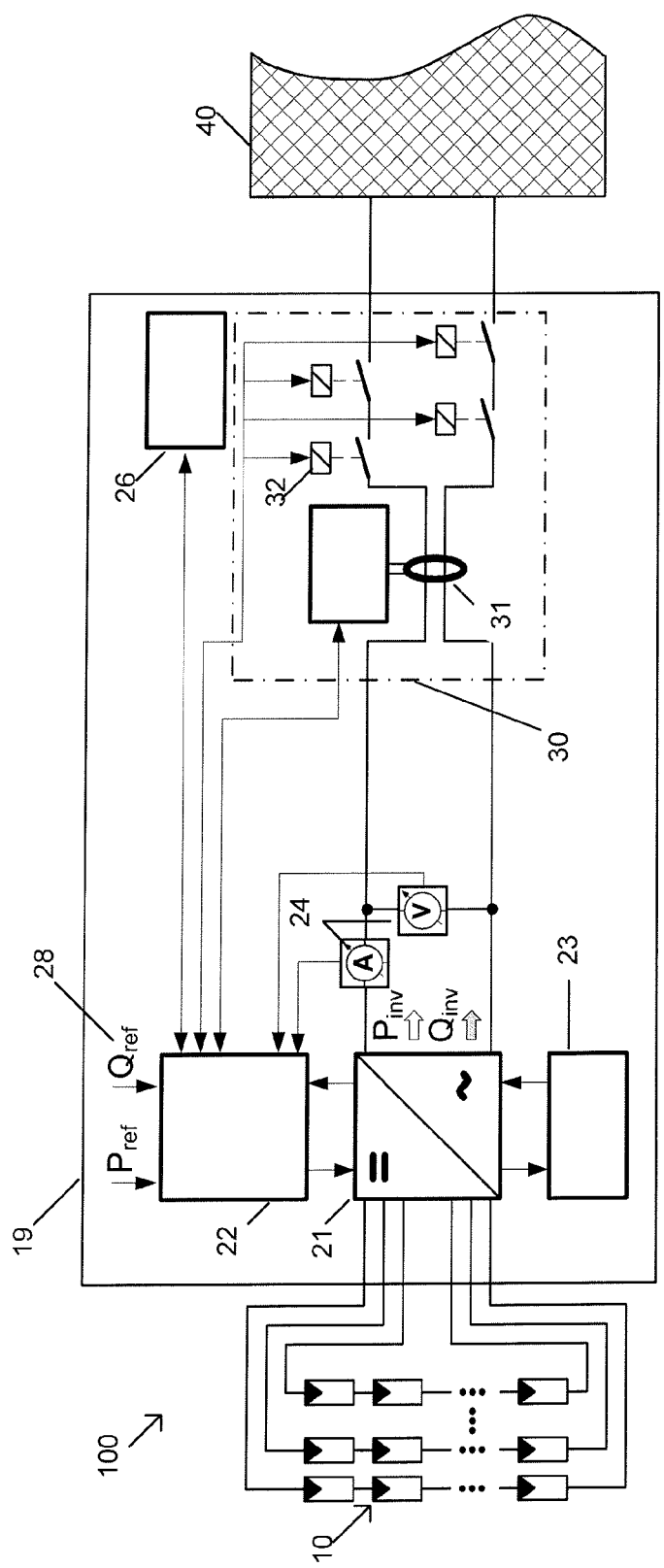
FIG. 2 shows a schematic illustration of a conventional inverter with a grid interface.

Further optional elements of a conventional inverter 19 are shown in the photovoltaic system 100 in FIG. 2. This inverter 19 also has an HMI 23, with the aid of which operating values of the inverter 19 can be displayed and the operation of the system 100 can be influenced, for example, by presetting nominal values 28 for the real power $P_{ref}$ and/or reactive power $Q_{ref}$ to be provided by the system. These nominal values 28 can alternatively also be transmitted via a communication unit 26, for example, as a value preset by an operator of the grid 40. The inverter 19 also has a grid interface 30 via which the abovementioned additional functionalities can be provided by the inverter. In one embodiment the grid interface 30 contains electromechanical or electronic switch disconnectors 32, in order to be able to disconnect the basic inverter from the grid 40. Safety functions, such as detection of voltage, frequency and isolation faults as well as detection of undesirable islanding or fault current monitoring that is sensitive to all types of current, are carried out by the safety device 31. The individual components of the grid interface 30 may in this case be connected centrally to the CPU 22, and may be controlled by it, or may be connected directly to one another.

Figure 3:
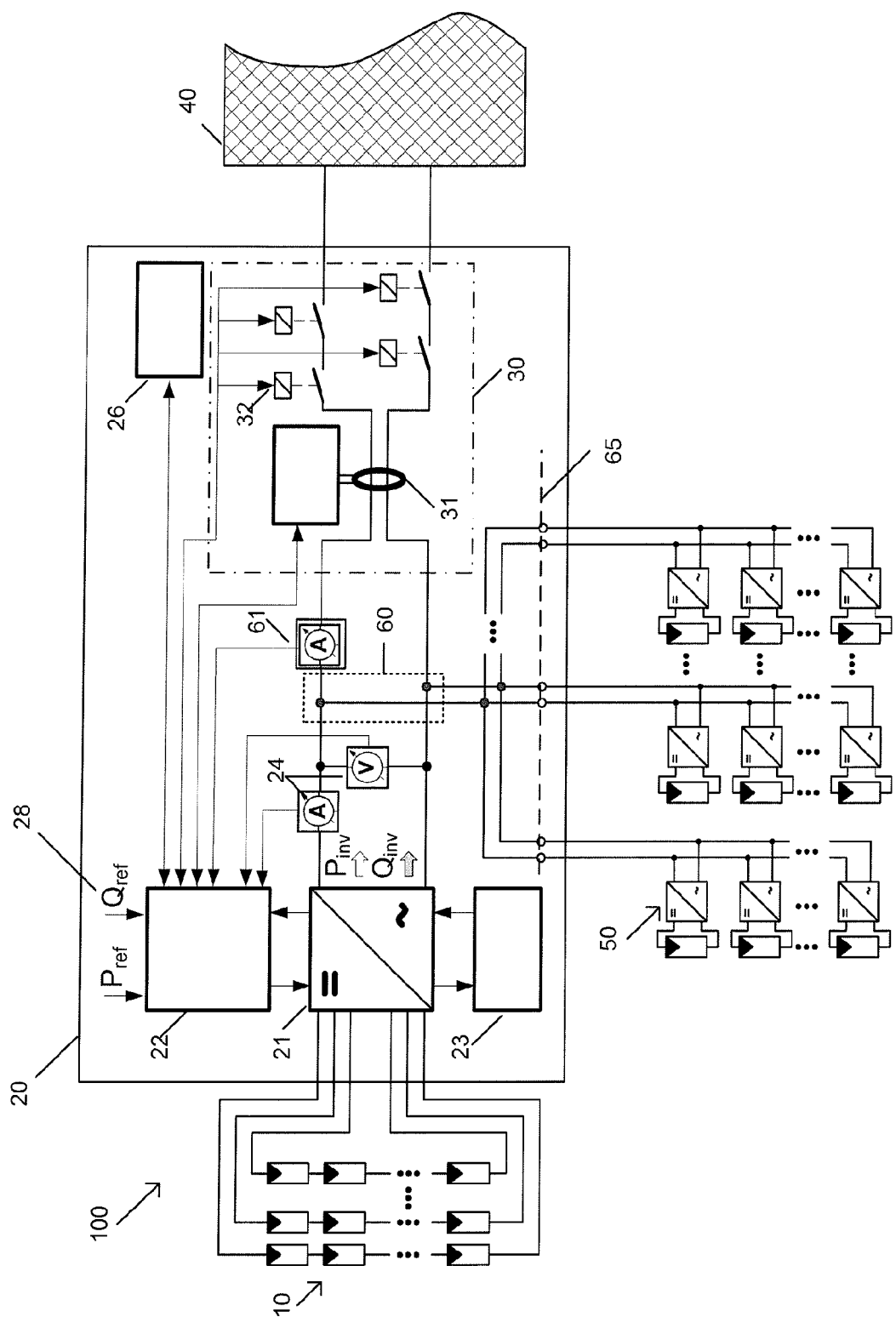
FIG. 3 shows a first embodiment of an inverter.

FIG. 3 illustrates one embodiment of a basic inverter 20 according to the invention. The basic inverter 20 is connected to the AC modules 50 via a connecting area 65 by an AC interface 60 that is integrated in the basic inverter 20 and that is arranged between the inverter bridge 21 and the grid interface 30. The illustrated basic inverter 20 furthermore has a measurement point 61 that can be used to selectively determine the current fed in by the AC modules 50. A PV system configuration can thus be implemented that is appropriate for the requirements mentioned above. The connecting area 65 may have one or more connections for AC modules 50, in which case one or more AC modules 50 can be connected to each connection. The connected AC modules 50 are in this way likewise protected by the grid interface 30 without themselves having to carry out the protection functions provided by the grid interface 30. The switch disconnectors 32 in the grid interface 30 are designed for the total power of the system 100, as a result of which the AC modules 50 do not require their own grid interface or their own switch disconnectors. The basic inverter 20 may either be designed as an inverter without a transformer, or as an inverter with a high-frequency transformer, or as an inverter with a grid transformer.

Figure 4:
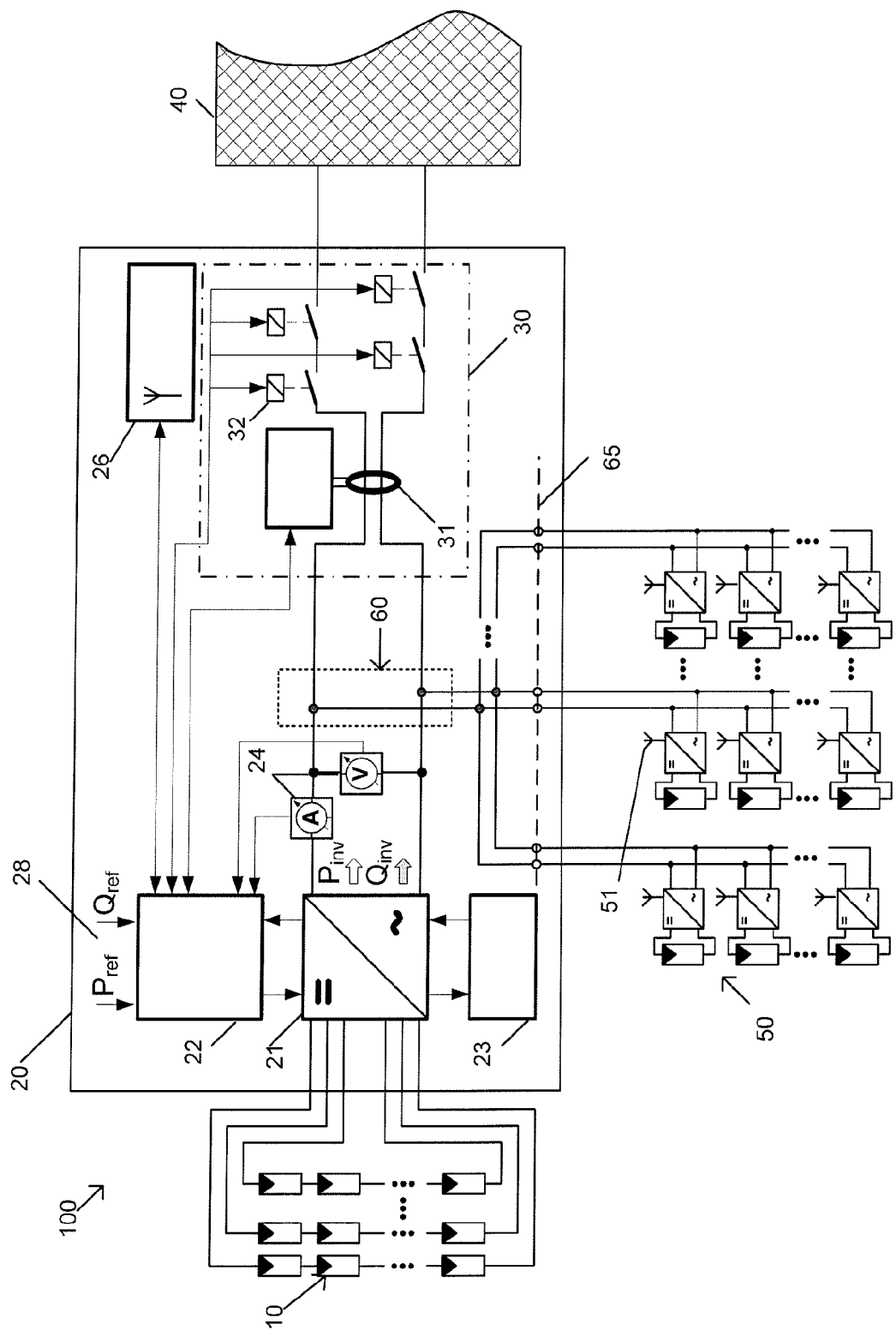
FIG. 4 shows a second embodiment of an inverter.

The basic inverter 20 in FIG. 4 has a communication unit 26 that is designed for wireless communication, for example radio transmission. In this case, the communication unit 26 may communicate in a simple manner with the AC modules 50 via their communication units 51, in order to transmit data in one or both directions, or else in order to control or to monitor the AC modules 50. Alternatively, the communication may, of course, also be provided via dedicated signal lines or by modulation onto the AC lines. The HMI 23 can also perform control and display functions for the AC modules 50 via the control and display elements for the basic inverter. Remote evaluation, remote diagnostics and/or remote control can be provided for the AC modules 50 via the communication unit 26 of the basic inverter 20. Measured values or records of events of the AC modules 50, such as breakdown or failures, can likewise be stored or transmitted. It is also feasible to transmit control signals for the connected AC modules 50.

Figure 5:
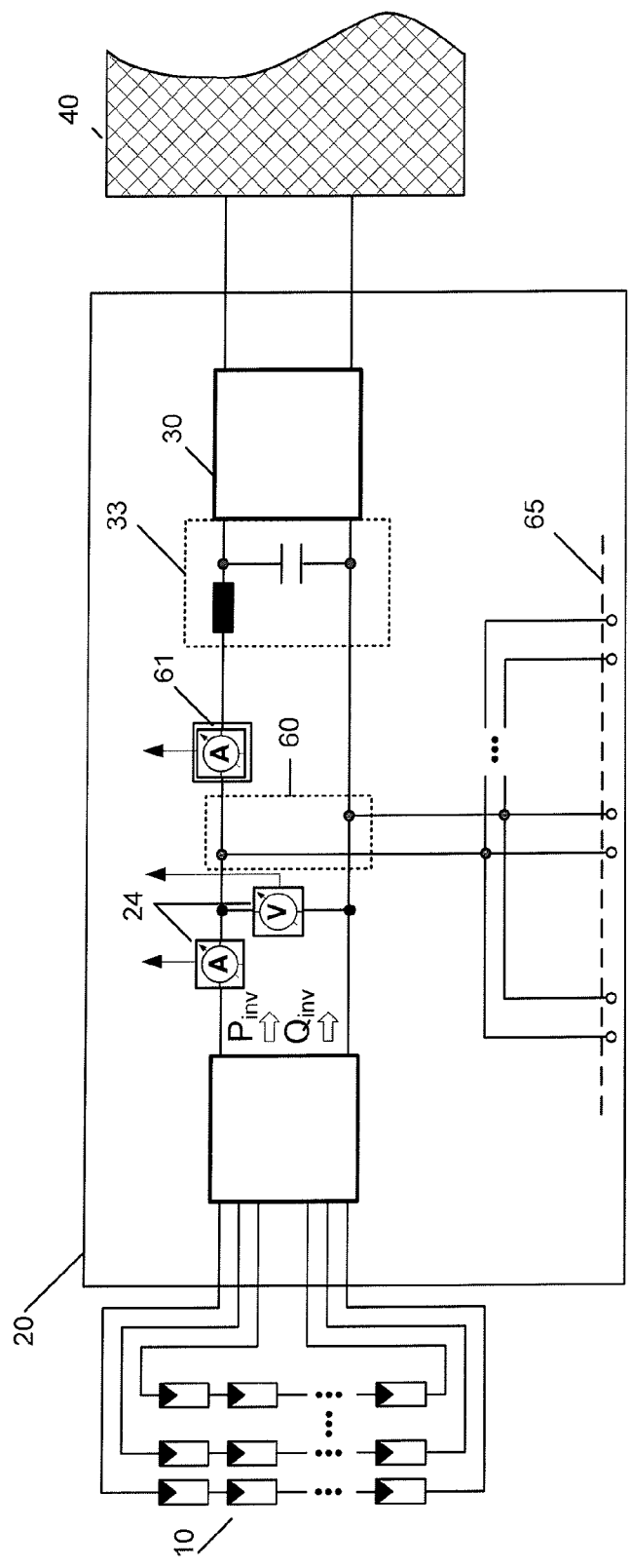
FIGS. 5 to 7 show further embodiments of an inverter with various arrangements of measurement points within the inverter.

In order to allow the feeding parameters of the inverter bridge 21 and of the connected AC modules 50 to be determined separately from one another, further measurement points are provided as compared to the conventional inverters 19 in FIGS. 1 and 2. In FIGS. 3 and 5, a further measurement point 61 is provided between the AC interface 60 and the grid interface 30 in order to additionally allow to record the sum current of the inverter bridge 21 and the AC interface 60. The current fraction of the AC interface 60 can therefore be determined easily by subtraction.

Figure 6:
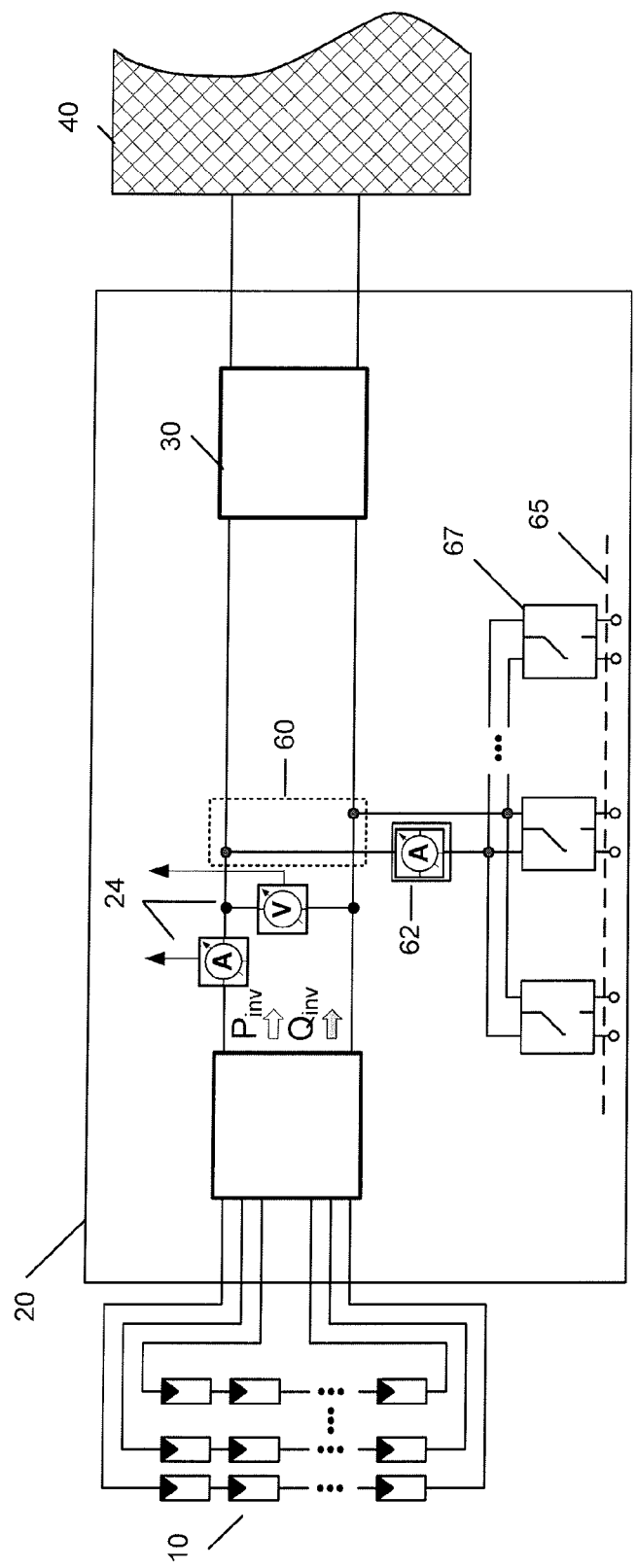

Alternatively, FIG. 6 shows an additional measurement point 62 in the current path of the AC interface 60 for determining the different current fractions. A further, alternative arrangement of the measurement points, which is not shown, can be used to measure the total current of the connected AC modules 50 and the sum current of the overall system 100, and to determine the current fraction of the inverter bridge 21 from this.

Figure 7:
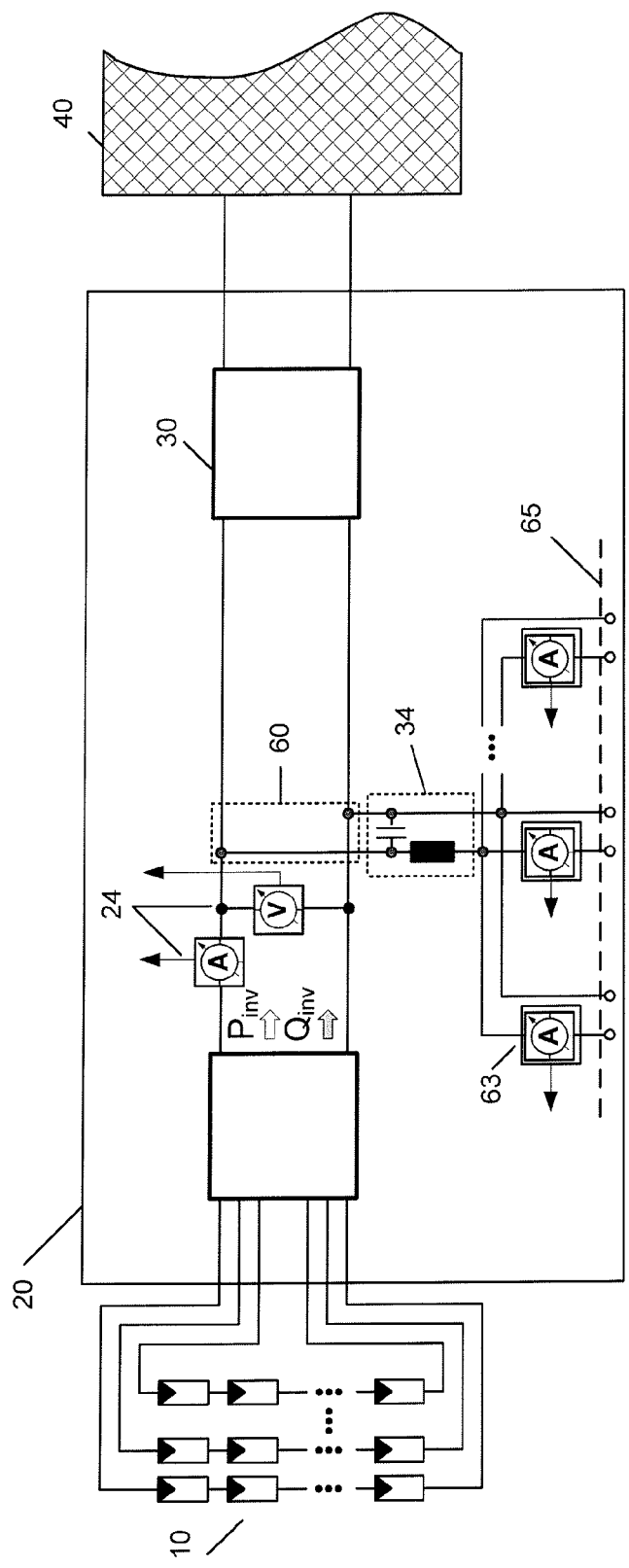

As shown in FIG. 7, each connection of the connecting point 65 can also be equipped with a measurement point 63 in order to allow a selective recording of the current fractions from the AC modules 50 connected to the AC interface 60, and, for example, to use this for installation monitoring.

Furthermore, FIG. 5 shows a grid interface 30 that has a filter device 33. The filter device 33 is used to remove or to sufficiently damp AC voltage components from the AC voltage to be fed into the grid 40 that are not at the grid frequency. The filter device 33 may, for example, be in the form of an LC bandpass filter and may be designed such that it can provide this function both for the inverter bridge 21 and for the connected AC modules 50. Alternatively, as is shown in FIG. 7, a further filter device 34 can also be arranged between the connecting area 65 and the AC interface 60, providing the filter function selectively for the connected AC modules 50.

As additional elements, FIG. 6 also shows a disconnecting device 67 for each connection of the connecting area 65. This can be controlled by the basic converter 20 such that the inverter or inverters that is or are connected to the respective connection can be selectively disconnected from the AC interface 60 by means of switches. In an operating variant, it is possible this way to record feeding parameters or to perform diagnostics of the connected AC modules 50 separately for the respective AC modules 50 or module groups connected to the various connections, such that the measured values determined by the further measurement points 61, 62 can be associated with the AC modules 50 or with a group of AC modules. Alternatively, one single disconnecting device 67 can also be provided in order to disconnect all of the connected AC modules 50. The disconnecting device can be integrated in all of the illustrated embodiments of the inverter according to the invention.

One connection of the connecting area 65 may be used as a reference input, and its current or feeding power can be recorded separately. It is then worthwhile installing a PV module, which is connected to an AC module 50, at a point in the PV installation that is never shadowed by obstructions, and to connect the corresponding AC module to the reference input. Discrepancies between the specific power of the reference module and of the remaining installation, or parts of the remaining installation, can thus be assessed.

A further option for the use of the basic inverter 20 according to the invention is for power factor correction for a load. For this purpose, at least one load is connected to the AC interface 60 in addition to (optional) AC modules 50. The basic inverter 20 can produce the reactive power demanded by the load itself via the measurement points at the input and at the grid connection, such that the overall photovoltaic system 100 behaves in a neutral form on the grid.

Nominal values 28 for the real power $P_{ref}$ and for the reactive power $Q_{ref}$ can be received via the communication unit 26 of the basic inverter 20 and transferred to the CPU 22, in order to allow the output real power and reactive power of the system 100 to be regulated as required. This allows grid services to be implemented, although the AC modules 50 need not necessarily themselves be capable of providing reactive power. It is sufficient for the basic inverter 20 to be designed as a feeding unit capable of providing reactive power.

The above statements apply to three-phase systems analogously; the basic inverter according to the invention with an AC interface can be used in this way for single-phase or polyphase grids. In the case of a polyphase grid, power distribution can be carried out via the connected single-phase AC modules 50 by splitting the AC modules 50 between the various phases via the AC interface 30. This power distribution can be controlled for the connected grid 40 by the basic inverter 20 in accordance with the requirements. In particular, it is considered to configure the assignment of the AC modules 50 to the phases they are feeding into to be variable in accordance with the requirements of the three-phase grid, for example in order to counteract grid unbalances.

Figure 8:
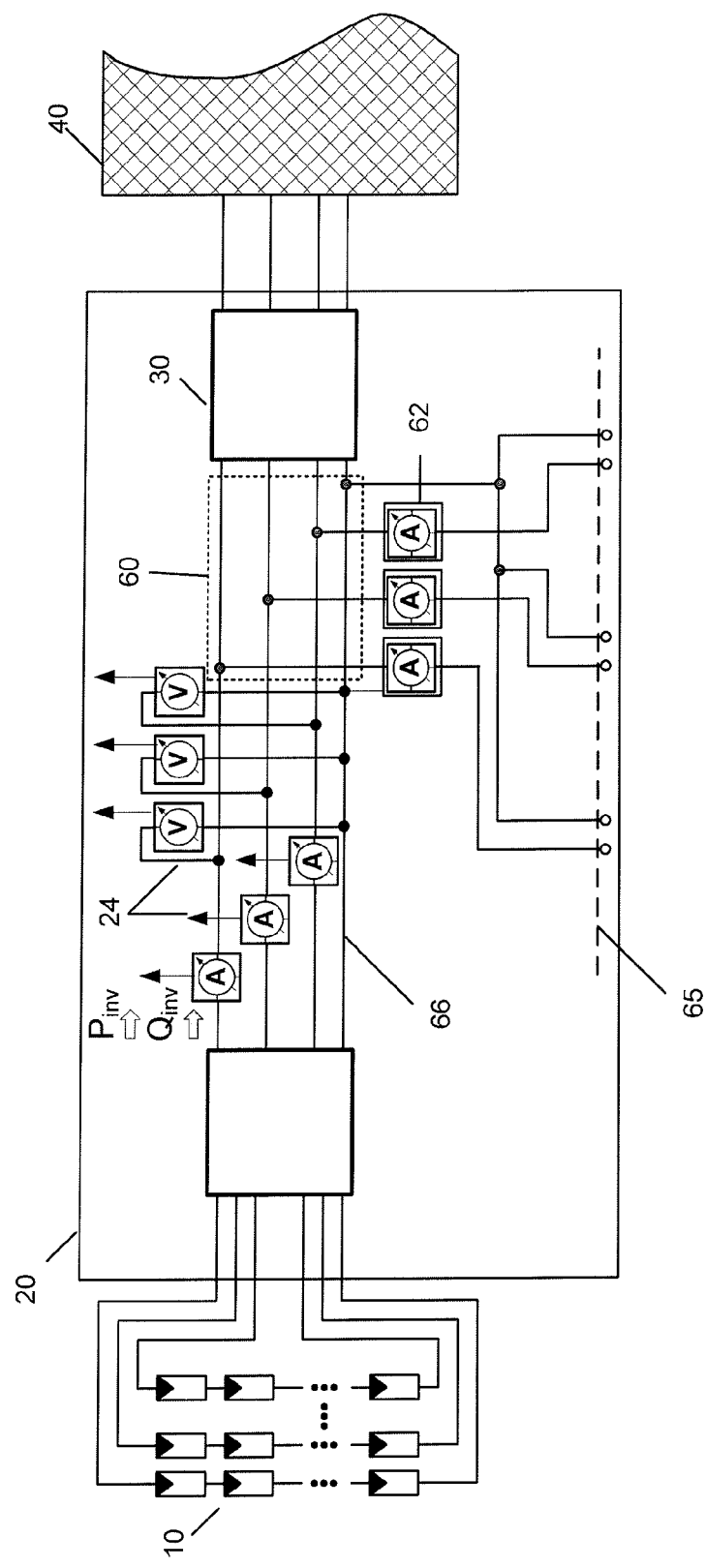
FIGS. 8 and 9 show further embodiments of an inverter.
Figure 9:
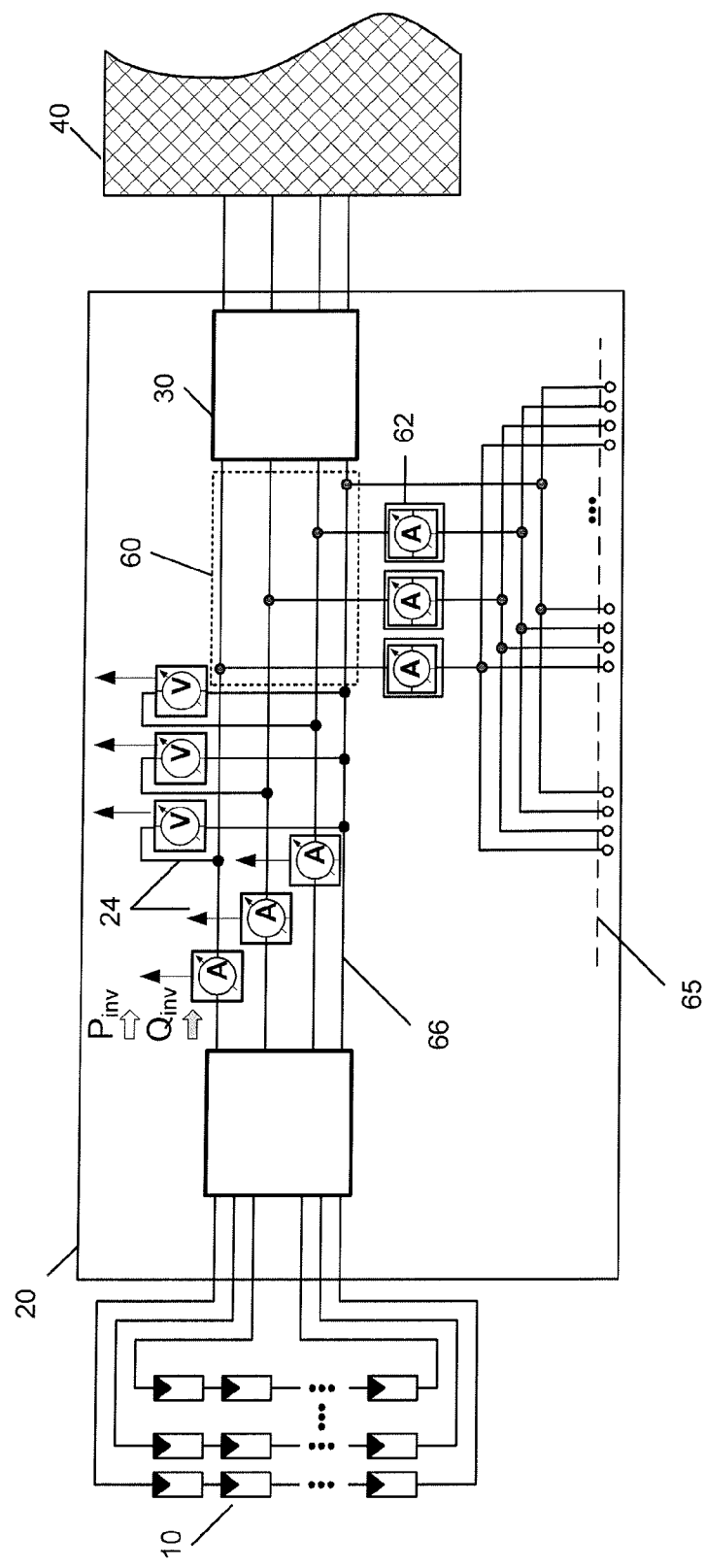

By way of example, FIG. 8 shows an arrangement of the AC interface 60 in which the single-phase AC modules that are connected to the three connections of the connecting area 65 each feed into one of the three phases of the basic inverter 20. All of the AC modules are in this case connected to a neutral conductor 66 of the basic inverter. A further measurement point 62 is in each case provided for each feeding point. Alternatively, FIG. 9 shows an arrangement in which one three-phase AC module can in each case be connected to each of the three connections of the connecting area 65. Instead of the illustrated connection arrangement of the respective AC modules between a neutral conductor and a selected phase (star arrangement), it is likewise feasible to connect the AC modules between two selected phases (delta arrangement).

The operation of the external AC modules 50 is monitored with the aid of the measurement points 24, 61, 62, 63 and an algorithm that is implemented in the CPU 22, which means that in one operating variant of the invention there is no need for communication between the AC modules 50 and the basic inverter 20. The AC modules 50 can therefore be designed very cost-efficiently, since their functionality can be reduced to inversion and MPP tracking. Monitoring of compliance with predetermined feeding parameters for the overall system 100, such as nominal values of the reactive power and real power, can be ensured despite the unregulated feeding by the AC modules, since the basic inverter 20 can control the feeding from the inverter bridge 21 such that, overall, the feeding from the inverter bridge 21 and the AC modules 50 corresponds to the nominal values. This results in a cost-effective, efficient overall photovoltaic system. It is likewise possible to monitor the feeding operation of the AC modules 50 using the basic inverter 20, and to produce an appropriate warning in the event of discrepancies that lead to the deduction that the AC modules 50 have failed, and to send or to indicate this warning by means of the communication unit 26 or the HMI 23. There is no need for communication with the AC modules for this purpose; the discrepancies are detected on the basis of the feeding parameters of the AC modules connected to the AC interface 60, which can be recorded selectively via the further measurement points 61, 62, 63, as described above, even if it may in some cases not be possible to unambiguously identify which of the connected AC modules has failed.

The basic inverter 20 can be equipped with a residual-current circuit breaker that is sensitive to all types of current. This allows the AC modules 50 to be configured as transformer-less inverters, and without their own safety components sensitive to all types of current, while still complying with existing safety regulations.

In one advantageous configuration, the photovoltaic system 100 is designed such that the part of the generator area that is at any time unshadowed feeds into the connected grid 40 via the inverter bridge 21. The part of the generator area that is shadowed at least at some times is included in the system 100 via the AC interface 60 by means of the AC modules 50. In general, that part of the area that is always unshadowed will make up the majority of the total generator area, such that the basic inverter 20 is advantageously configured such that the maximum power to be fed via the inverter bridge 21 is at least as high as the maximum power to be fed via the AC interface 60. This results in the components of the basic inverter 20 being used particularly efficiently, while at the same time reducing the complexity for the overall photovoltaic system 100, by means of the described joint use of certain components.

The invention claimed is:

1. An inverter for feeding a grid-compatible AC voltage into a grid, comprising:
    an inverter bridge configured to convert a DC voltage to a first AC voltage;
    a grid interface between the inverter bridge and an inverter output configured to couple to the grid, wherein the grid interface is configured to convert the first AC voltage to the grid-compatible AC voltage for feeding into the grid; and
    an AC interface arranged between the inverter bridge and the grid interface, and configured to be coupled to one or more AC modules for feeding into the grid,
    wherein the inverter bridge, the grid interface and the AC interface are all arranged within the inverter, and
    wherein a maximum power to be fed thereto via the AC interface is less than a maximum power to be fed thereto via the inverter bridge.

2. The inverter according to claim 1, wherein the grid interface comprises one or more switch disconnectors configured to selectively disconnect the inverter from the inverter output and/or connect the inverter output to the grid.

3. The inverter according to claim 2, wherein the switch disconnectors are operated dependent on a state of the grid when coupled to the inverter output.

4. The inverter according to claim 3, wherein the state of the grid concerns a voltage and/or a frequency of an electrical current within the grid and/or an islanding condition.

5. The inverter according to claim 1, wherein the grid interface comprises a filter device.

6. The inverter according to claim 1, wherein the grid interface comprises a safety device.

7. The inverter according to claim 1, further comprising a disconnecting device arranged between the AC interface and a connecting area configured to connect the AC modules to the inverter.

8. The inverter according to claim 1, wherein the inverter comprises one or more measurement points configured to measure a current value associated with the inverter bridge and a current value associated with the AC interface.

9. The inverter according to claim 1, wherein the inverter bridge is configured to provide reactive power.

10. The inverter according to claim 1, wherein the inverter bridge is configured to provide a three-phase AC voltage.

11. The inverter bridge according to claim 10, wherein the AC interface is configured to distribute a power fed by the AC modules when coupled to the AC interface among the phases of the AC voltage.

12. An inverter for feeding a grid-compatible AC voltage into a grid, comprising:
    an inverter bridge configured to convert a DC voltage to a first AC voltage;
    a grid interface between the inverter bridge and an inverter output configured to couple to the grid, wherein the grid interface is configured to convert the first AC voltage to the grid-compatible AC voltage for feeding into the grid; and
    an AC interface arranged between the inverter bridge and the grid interface, and configured to be coupled to one or more AC modules for feeding into the grid,
    wherein the inverter bridge, the grid interface and the AC interface are all arranged within the inverter,
    wherein the inverter further comprises a communication unit configured to exchange data with the AC modules when coupled to the AC interface.

13. The inverter according to claim 12, wherein the communication unit is configured to exchange data via lines of the AC interface.

14. The inverter according to claim 12, wherein the communication unit is configured to exchange data with the AC modules in a wireless fashion.

15. The inverter according to claim 12, wherein the communication unit is configured to exchange data for one of the following purposes:
    remote control or remote diagnostics of connected AC modules;
    storage or transmission of measured values, breakdown or failures of connected AC modules;
    transmission of control signals to connected AC modules; and
    display of data of connected AC modules (50) on a display unit of the inverter.

16. A photovoltaic system having an inverter for feeding a grid-compatible AC voltage into a grid, comprising:
    an inverter bridge configured to convert a DC voltage to a first AC voltage;
    a grid interface between the inverter bridge and an inverter output configured to couple to the grid, wherein the grid interface is configured to convert the first AC voltage to the grid-compatible AC voltage for feeding into the grid; and
    an AC interface arranged between the inverter bridge and the grid interface, and configured to be coupled to one or more AC modules for feeding into the grid,
    wherein the inverter bridge, the grid interface and the AC interface are all arranged within the inverter, and
    wherein a maximum power to be fed thereto via the AC interface is less than a maximum power to be fed thereto via the inverter bridge.

17. The inverter of claim 1, wherein the inverter is configured to centrally convert and feed the grid-compatible AC voltage into the grid, and wherein the one or more AC modules are configured to feed in a decentralized manner corresponding AC voltages into the grid through the AC interface of the inverter.

18. The photovoltaic system having the inverter of claim 16, wherein the inverter is configured to centrally convert and feed the grid-compatible AC voltage into the grid, and wherein the one or more AC modules are configured to feed in a decentralized manner corresponding AC voltages into the grid through the AC interface of the inverter.

* * * * *